United States Patent
Seo et al.

(10) Patent No.: US 8,769,563 B2
(45) Date of Patent: Jul. 1, 2014

(54) DISPLAY APPARATUS AND METHOD FOR PROVIDING APPLICATION FUNCTION APPLYING THERETO

(75) Inventors: Bo-sung Seo, Suwon-si (KR); Kum-yon Han, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 13/197,437

(22) Filed: Aug. 3, 2011

(65) Prior Publication Data

US 2012/0047528 A1    Feb. 23, 2012

(30) Foreign Application Priority Data

Aug. 23, 2010  (KR) .............................. 2010-0081544

(51) Int. Cl.
  *H04N 7/025*  (2006.01)
  *H04N 21/431*  (2011.01)
  *H04N 21/454*  (2011.01)

(52) U.S. Cl.
  CPC ......... *H04N 21/4316* (2013.01); *H04N 21/454* (2013.01)
  USPC ................... 725/32; 725/37; 725/40; 725/43; 725/48

(58) Field of Classification Search
  CPC .................... H04N 21/4316; H04N 21/454
  USPC .................... 725/32, 37, 40, 43, 48
  See application file for complete search history.

(56) References Cited

U.S. PATENT DOCUMENTS

| | | | |
|---|---|---|---|
| 8,209,713 B1* | 6/2012 | Lai et al. ........................ | 725/10 |
| 8,230,343 B2* | 7/2012 | Logan et al. .................. | 715/723 |
| 2002/0026642 A1* | 2/2002 | Augenbraun et al. ........ | 725/109 |
| 2002/0194592 A1 | 12/2002 | Tsuchida et al. | |
| 2002/0194595 A1* | 12/2002 | Miller et al. .................... | 725/36 |
| 2006/0031885 A1* | 2/2006 | Colter et al. ................... | 725/61 |
| 2009/0070814 A1* | 3/2009 | Kim et al. ....................... | 725/40 |
| 2009/0172746 A1* | 7/2009 | Aldrey et al. .................. | 725/61 |
| 2010/0293577 A1* | 11/2010 | Hnyk et al. .................... | 725/44 |
| 2011/0047573 A1* | 2/2011 | Onogi et al. ................... | 725/41 |
| 2011/0109801 A1* | 5/2011 | Thomas et al. .............. | 348/565 |
| 2012/0090009 A1* | 4/2012 | Cook et al. .................... | 725/52 |
| 2012/0174155 A1* | 7/2012 | Mowrey et al. ................ | 725/40 |

FOREIGN PATENT DOCUMENTS

| | | | |
|---|---|---|---|
| EP | 2 252 051 A1 | | 11/2010 |
| JP | 2009-118502 A | | 5/2009 |
| KR | 10-2005-0014945 A | | 2/2005 |
| KR | 10-2008-0058718 A | | 6/2008 |
| WO | 2005/107406 A2 | | 11/2005 |

OTHER PUBLICATIONS

Communication, dated Dec. 4, 2013, issued by the European Patent Office in counterpart European Patent Application No. 11170558.8.

* cited by examiner

*Primary Examiner* — Pankaj Kumar
*Assistant Examiner* — Sahar Baig
(74) *Attorney, Agent, or Firm* — Sughrue Mion, PLLC

(57) ABSTRACT

A display apparatus performs an application related function using broadcast information of a broadcast image which is currently being displayed when a command to perform the application related function is input by the user. Accordingly, the user is able to easily select the application related to the program which is currently being broadcasted.

12 Claims, 12 Drawing Sheets

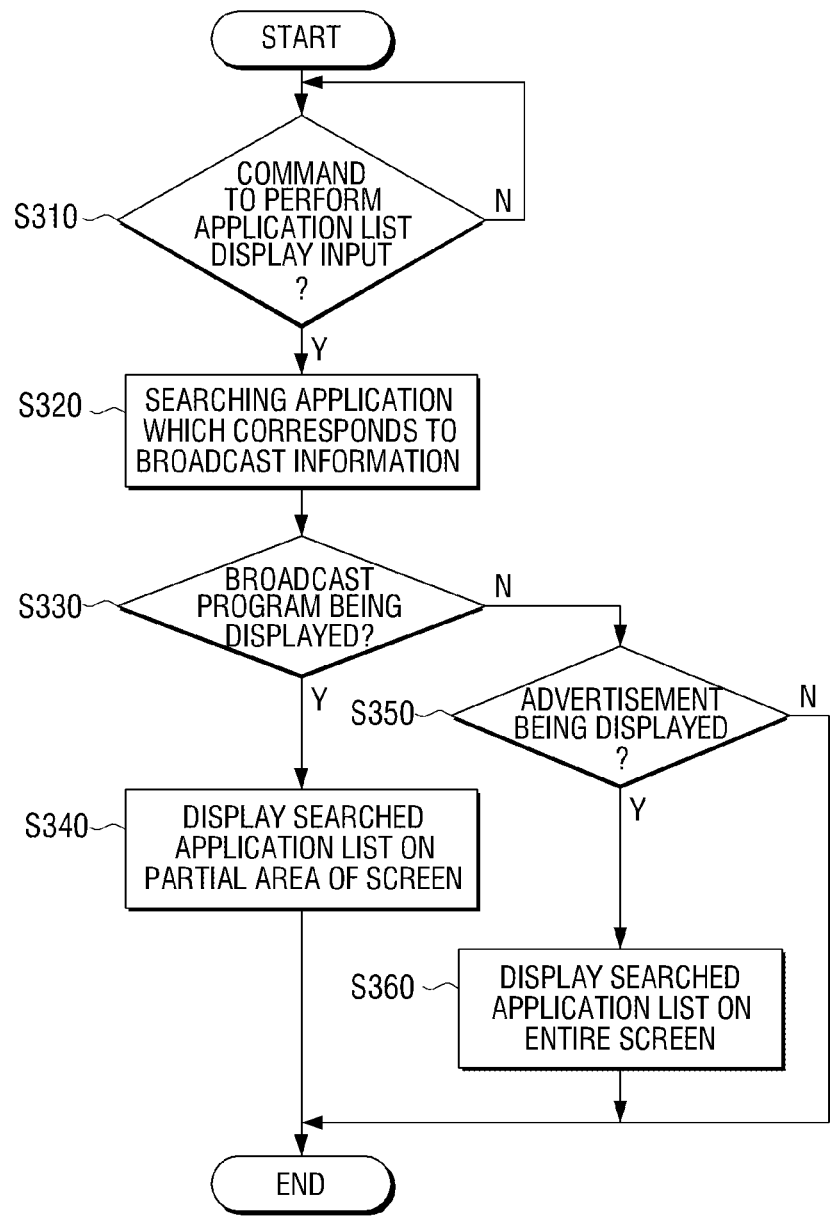

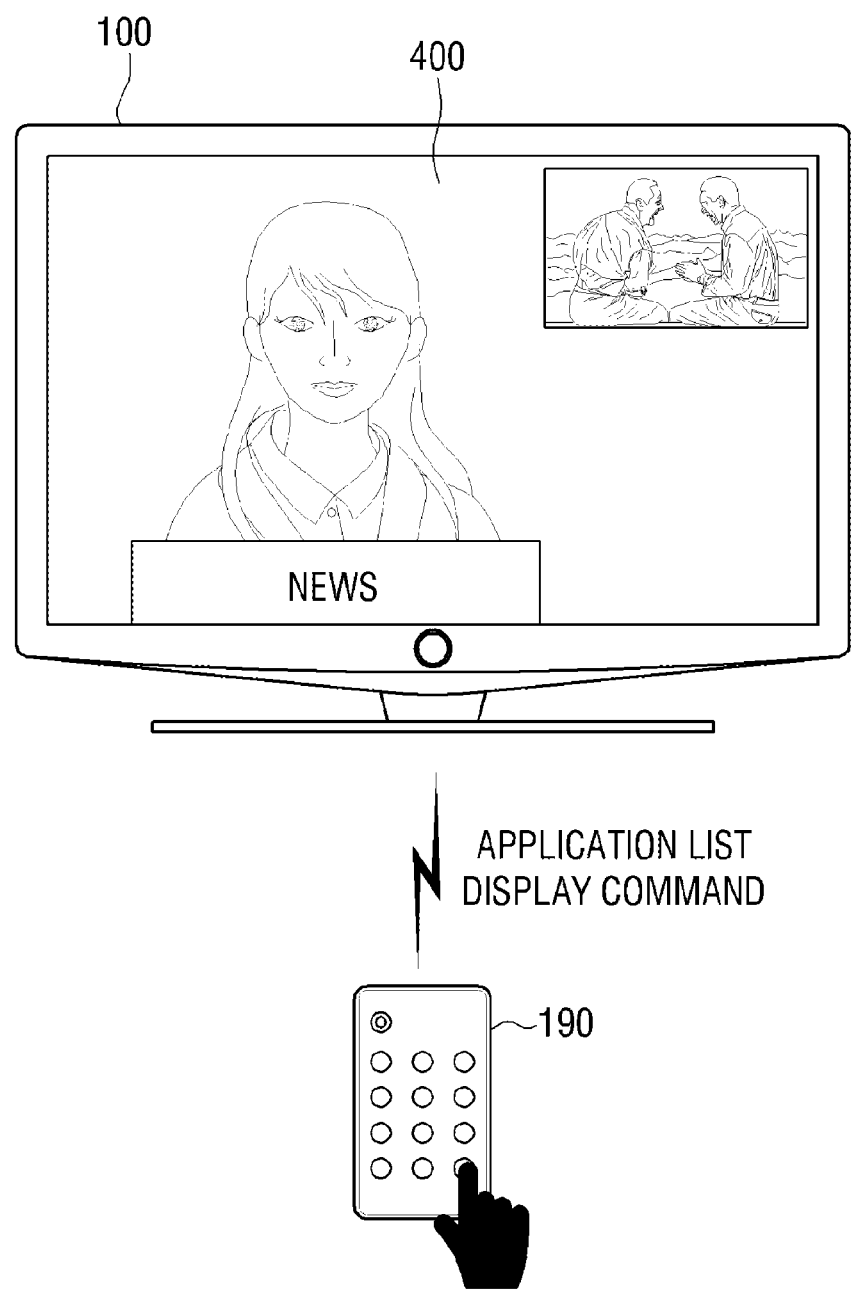

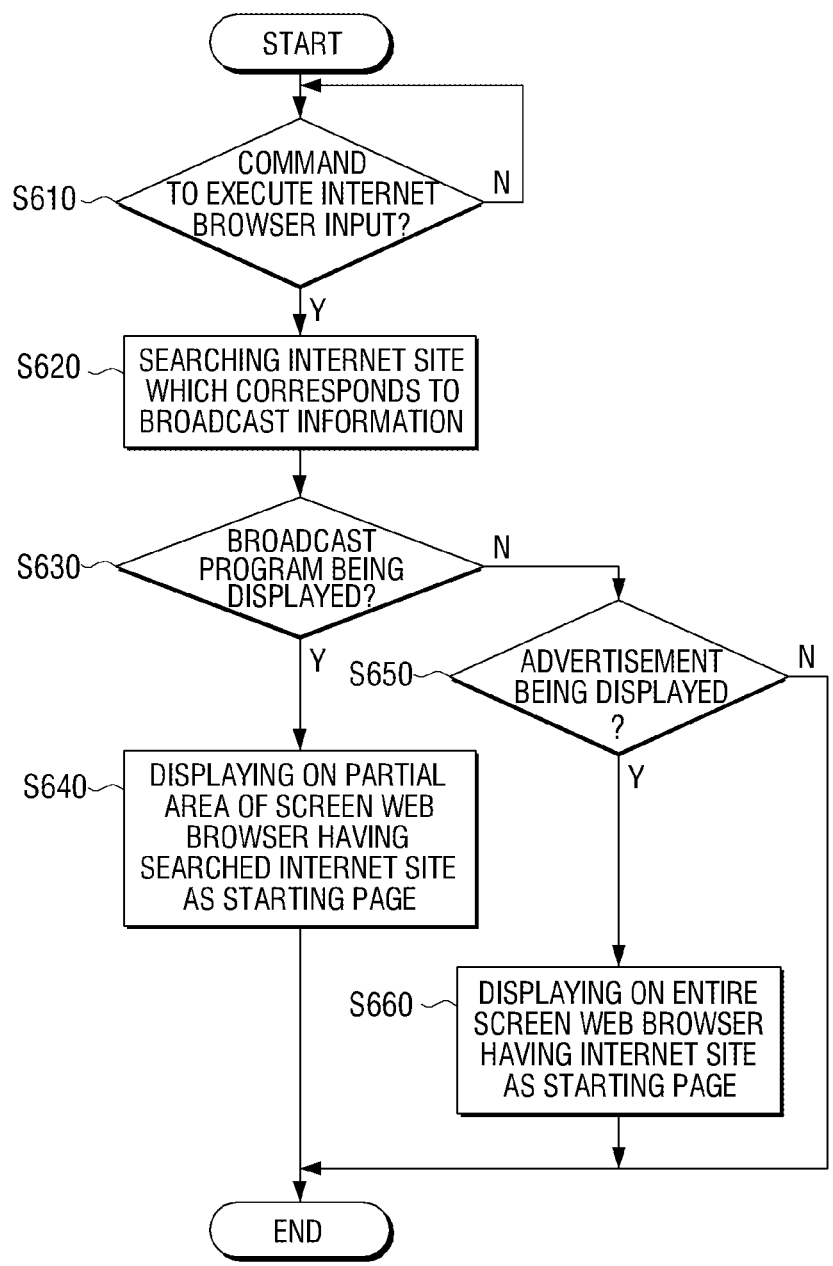

DISPLAY APPARATUS AND METHOD FOR PROVIDING APPLICATION FUNCTION APPLYING THERETO

CROSS-REFERENCE TO RELATED APPLICATION

This application claims priority from Korean Patent Application No. 2010-81544, filed in the Korean Intellectual Property Office on Aug. 23, 2010, the entire disclosure of which is incorporated herein by reference in its entirety.

BACKGROUND

1. Field of the Exemplary Embodiments

Apparatuses consistent with exemplary embodiments relate generally to a display apparatus and a method for providing an application function applicable to the display apparatus. More specifically, an apparatus and method consistent with the exemplary embodiments described herein relate to a display capable of providing an application function and a method for providing such an application function to the display.

2. Description of the Prior Art

Recently, there has been consistent development with respect to technologies that receive broadcasts on various display apparatuses and providing numerous applications to the display apparatuses. In addition, as internet technology has developed, it has become possible to access various internet services using a TV or cellular phone. For instance, IPTV can connect to the internet and execute applications, such as widget.

Accordingly, the number of contents that can be used through one display apparatus has increased rapidly. Therefore, it has become difficult for users to search for a particular application that they want to use from among the numerous applications available.

Thus, there is a need for providing an easier way to search for the particular application from among the numerous available applications.

SUMMARY OF THE INVENTION

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a display apparatus which performs an application related function using broadcast information on a broadcast image which is currently displayed if a command to perform the application related function is input by a user and a method for providing application function applicable thereto.

According to an exemplary embodiment of the present disclosure, a display apparatus includes a broadcast receiving unit which receives a broadcast signal and broadcast information; a display unit which displays a broadcast image which corresponds to the broadcast signal; and a controlling unit which performs an application related function using broadcast information on a broadcast image which is currently being displayed, when a command to perform an application related function is input by a user.

The broadcast information may be meta data on the broadcast program.

The broadcast information may include at least one of title information of the broadcast program, contents provider information, and category information.

The application related function may be an application list display function, and the controlling unit may search an application which corresponds to the broadcast information on the broadcast image which is currently being displayed, and may control so that a list on the searched application is displayed on a screen, if a command to perform the application list display function is input by the user.

The controlling unit may control so that a list on the applications which correspond to at least one of the title information of the broadcast image, the contents provider information, and the category information of among the applications executable in the display apparatus is displayed on the screen.

The application related function may be an internet web browsing application function, and the controlling unit may control so that a web page which corresponds to the broadcast information on the broadcast image which is currently being displayed is displayed as a starting page, if a command to perform the internet web browsing application function is input by the user.

The controlling unit controls so that the application related function is displayed on an entire screen, if a command to perform the application related function is input by the user during when an advertisement is displayed.

The controlling unit controls so that a screen where the applications related function is performed is displayed on a partial area of the screen, if a command to perform the application related function is input by the user during when a broadcast program is displayed.

According to an exemplary embodiment of the present disclosure, a method for providing application function comprises receiving a broadcast signal and a broadcast information; displaying a broadcast image which corresponds to the broadcast signal; and performing the application related function using the broadcast information on the broadcast image which is currently being displayed, if a command to perform the application related function is input by a user.

The broadcast information may be meta data on the broadcast program.

The broadcast information may include at least one of title information of the broadcast program, contents provider information, and category information.

The application related function may be an application list display function, and the performing the application related function may include searching an application which corresponds to the broadcast information on the broadcast image which is currently being displayed, if a command to perform the application list display function is input by the user; and displaying on a screen a list on the searched application.

The searching may search an application which corresponds to at least one of title information of the broadcast image, contents provider information, and category information of among the applications executable in the display apparatus.

The application related function may be an internet web browsing application function, and the performing the application related function may display a web page which corresponds to the broadcast information on the broadcast image which is currently being displayed as a starting page, if a command to perform the internet web browsing application function is input by the user.

The performing the application related function may display a screen where the application related function is displayed on an entire screen, if a command to perform the application related function is input by the user during when the advertisement is displayed.

The performing the application related function may display a screen where the application related function is displayed on a partial area of the screen, if a command to perform the application related function is input by the user during when the broadcast program is displayed.

According to various exemplary embodiments of the present disclosure, when a command to perform the application related function by the user, a display apparatus which performs the application related function using the broadcast information on the broadcast image which is currently being displayed and method for providing the application function applicable thereto, and the user becomes able to select the application related to the program which is currently being broadcasted easily.

In addition, since the site related to the program which is being broadcasted when the web browser application is being executed in the display apparatus is displayed as the starting page, the user is able to see the information on the program which is currently being broadcasted more easily.

BRIEF DESCRIPTION OF THE DRAWINGS

The above and/or other aspects will be more apparent by describing in detail exemplary embodiments, with reference to the accompanying drawings, in which:

FIG. 3 is a flow chart provided to explain a process of performing an application list display command according to an exemplary embodiment of the present invention, FIGS. 4A and 4B illustrate a screen where the application list display command is performed during when a broadcast program is being displayed according to an exemplary embodiment of the present disclosure, FIG. 6 is a flow chart provided to explain a process of performing an internet web browser execution command according to an exemplary embodiment of the present disclosure.

DETAILED DESCRIPTION OF THE PREFERRED EMBODIMENTS

Figure 1:
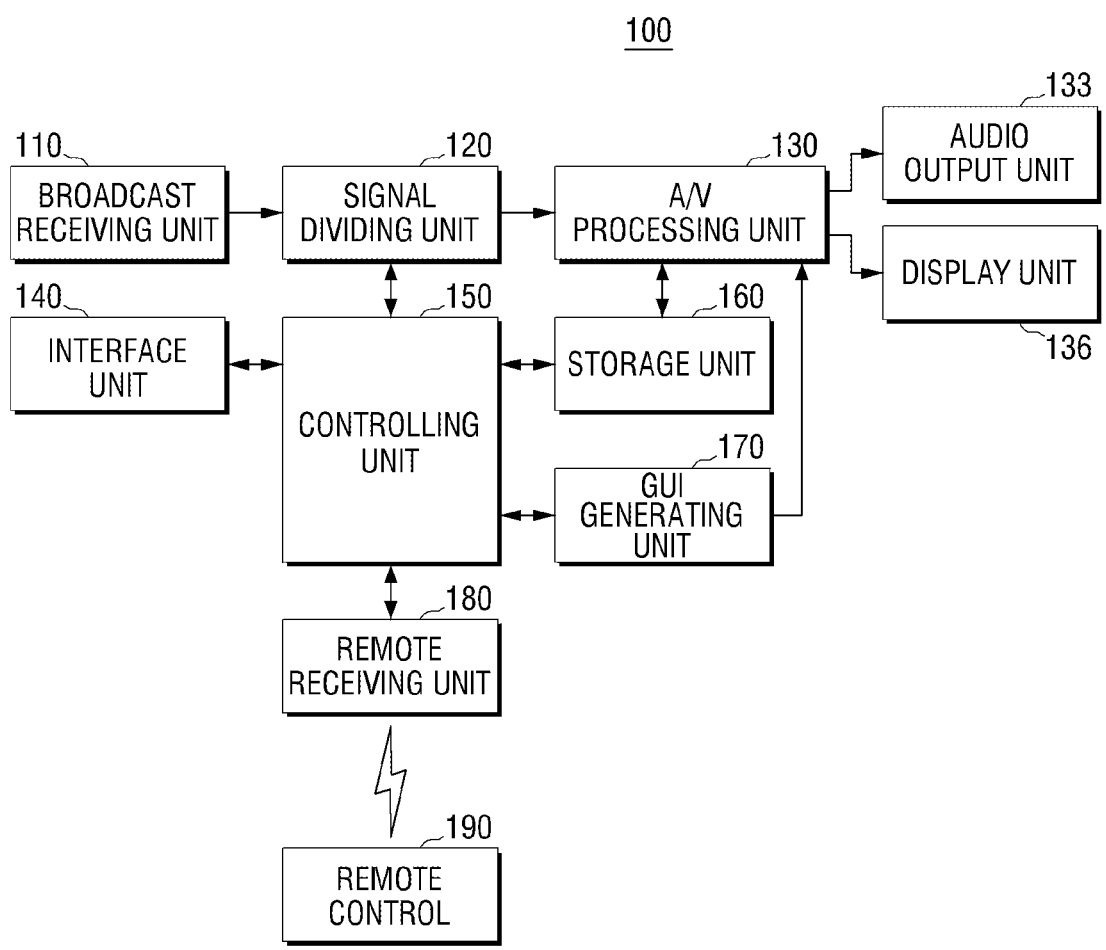
FIG. 1 is a block diagram illustrating a configuration of a TV according to an exemplary embodiment of the present disclosure.

Certain exemplary embodiments are described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram which illustrates a detailed configuration of a TV according to an exemplary embodiment of the present disclosure. As illustrated in FIG. 1, a TV 100 comprises a broadcast receiving unit 110, a signal dividing unit 120, an A/V processing unit 130, an audio output unit 133, a display unit 136, an interface unit 140, a controlling unit 150, a storage unit 160, a GUI generating unit 170, and a remote control receiving unit 180.

The broadcast receiving unit 110 receives a broadcast signal via a wire or wirelessly from a broadcasting station or a satellite and modulates the broadcast signal. Herein, broadcast information may be a broadcast program and meta data on advertisement. The broadcast receiving unit 110 receives an EPG information together with a broadcast signal, and in the received EPG information, a broadcast program and meta data of advertisement is included. The meta data comprises information of title of broadcast programs or advertisements, broadcasting time information, channel information, contents provider information, category information, and genre information.

The signal dividing unit 120 divides the received signal into an image signal, a voice signal, and broadcast information. In addition, the signal dividing unit 120 transmits the image signal and the voice signal to the A/V processing unit 130, and transmits broadcast information to the controlling unit 150.

The A/V processing unit 130 performs signal processing such as video decoding, video scaling, and audio decoding on the image signal and voice signal input by the signal dividing unit 120. In addition, the A/V processing unit 130 outputs the image signal to the display unit 136, and outputs the voice signal to the audio output unit 133.

On the other hand, in the case of storing the image signal and the voice signal to the storage unit 160 or transmitting the image signal and the voice signal to an external device through the interface unit 140, the A/V processing unit 130 outputs the image signal and the voice signal in a compressed form to the storage unit 160 or the interface unit 140.

The audio output unit 133 outputs the voice which is output from the A/V processing unit 130 through a speaker, or to an external device (for example, external speaker) through an external output terminal.

The display unit 136 displays the image output by the A/V processing unit 130 on a display. That is, the display unit 136 displays a broadcast image corresponding to the broadcast signal. The broadcast image is the image which has been received through the broadcast signal and which is currently being displayed. The broadcast image includes a broadcast program image and an advertisement image.

In addition, the display unit 136 may display GUIs generated in the GUI generating unit 170 on a screen. More specifically, the display unit 136 may display GUIs for performing application related functions. For example, the display unit 136 may display GUIs for performing an application list display function. Furthermore, the display unit 136 may display a GUI for performing an internet web browsing application function.

Herein, an application list is a list of applications that can be executed in the TV 100. The application list may be displayed on the screen in a form of including a plurality of icons corresponding to a plurality of applications. Therefore, the application list display function may be one of the application related functions.

In addition, the internet web browsing application is an application for displaying an internet site on the TV 100 screen. The internet web browsing application displays a starting page at a first execution.

The interface unit 140 connects the TV 100 to a communication network such as the internet so that communication is possible. In addition, the interface unit 140 receives information and data for performing the internet web browsing function. Therefore, the TV 100 communicates with an external server through the interface unit 140 to perform internet related application functions.

The storage unit 160 stores various applications. For example, the storage unit 160 may store various applications such as a widget application, and an internet web browsing application. The storage unit 160 may be a hard disk or a non-volatile memory.

The GUI generating unit 170 generates a GUI to be displayed on the screen, and adds the generated GUI to the image output by the A/V processing unit 130. Especially, the GUI generating unit 170 generates a related GUI on the screen for performing the application list display function and on the internet web browsing application screen.

The remote control 190 receives a user's manipulation and transmits the manipulation to the TV 100 through the remote receiving unit 180. More specifically, the remote control 190 receives a command to perform an application related function from the user, and transmits the command to perform the received application related function to the remote control receiving unit 180.

For example, the TV 100 receives a command to perform an application list display function. In addition, the TV 100 may receive a command to perform an internet web browsing application function through the remote control.

The controlling unit 150 understands the user command based on the content of the user's manipulation transmitted from the remote control 190, and controls the overall operation of the TV 100 according to the user command.

The controlling unit 150 performs the application related function using the broadcast information on the broadcast image currently being displayed, if the command to perform the application related function is received from the user. Herein, the application related function is the function related to the application provided by the TV 100. The application related function includes not only a function which performs a particular application but also a function which displays a list of various applications.

More specifically, the controlling unit 150 compares the broadcast information on the broadcast image currently being displayed with the application related information, when the command to perform the application related function is input. In addition, the application related function which corresponds to the broadcast information currently being displayed is performed.

For example, the controlling unit 150 may perform the application function which corresponds to the title information of the broadcast program. Furthermore, the controlling unit 150 may perform the application function related to the contents provider of the broadcast program.

Specific examples of the application related function include the application list display function and the internet web browsing application function.

As a first example, if a command to perform the application list display function is input by the user, the controlling unit 150 searches the application which corresponds to the broadcast information on the broadcast image currently being displayed, and controls the display unit so that a list on the searched application is displayed on the screen. Herein, the controlling unit 150 controls so that of among the executable applications, a list on the applications which correspond to at least one of the title information of the broadcast image, the contents provider information, and the category information is displayed on the screen.

For example, if the category information of the broadcast image which is currently being broadcasted is sports, the controlling unit 150 controls the display unit so that a list of the applications related to sports is displayed on the screen.

As aforementioned, since the controlling unit 150 displays the applications which correspond to the image currently being broadcasted as a list, the user can easily select the application related to the program which is currently being broadcasted.

As a second example, if a command to perform the internet web browsing application function is input by the user, the controlling unit 150 controls so that the web page which corresponds to the broadcast information on the broadcast image currently is displayed as a starting page. That is, the controlling unit 150 sets the web page which corresponds to the broadcast information as the starting page, when the internet web browsing application is executed.

For example, in the case where the contents provider information of the broadcast image currently being broadcasted is "CNN", the controlling unit 150 may set the website of "CNN" as the starting page and display it when the internet web browsing application is executed.

As aforementioned, since the site related to the program which is being broadcasted when the web browser application is executed is displayed as the starting page, the user can see the information on the program which is currently being broadcasted more easily.

Meanwhile, in the case where a command to perform the application related function is input by the user when an advertisement is displayed, the controlling unit 150 can control so that the screen where the application related function is performed is displayed in the entire screen. For example, in the case where a command to perform the application list display function is input by the user when an advertisement is being displayed, the controlling unit 150 controls the apparatus so that the application list is displayed as the entire screen.

On the other hand, in the case where a command to perform the application related function is input by the user when the broadcast program is being displayed, the controlling unit 150 controls so that the screen where the application related function is performed is displayed on a partial area of the entire screen. For example, in the case where a command to perform the internet web browsing application is input by the user when the broadcast program is being displayed, the controlling unit 150 may control so that the broadcast program is displayed on the left half of the screen, and the internet web browser is displayed on the right half of the screen.

As aforementioned, the controlling unit 150 regulates the size of the application function screen according to whether the broadcast image which is currently being displayed is an advertisement or a broadcast program. Therefore, the user is able to concentrate on using the application during the advertisement time, and use the application while watching the broadcast program during the broadcast program time.

As aforementioned, in the case where a command to perform the application related function by the user is input, the controlling unit 150 performs the application related function using the broadcast information on the broadcast image which is currently being displayed. Therefore, the user is able to select the application related to the program which is currently being broadcasted.

Figure 2:
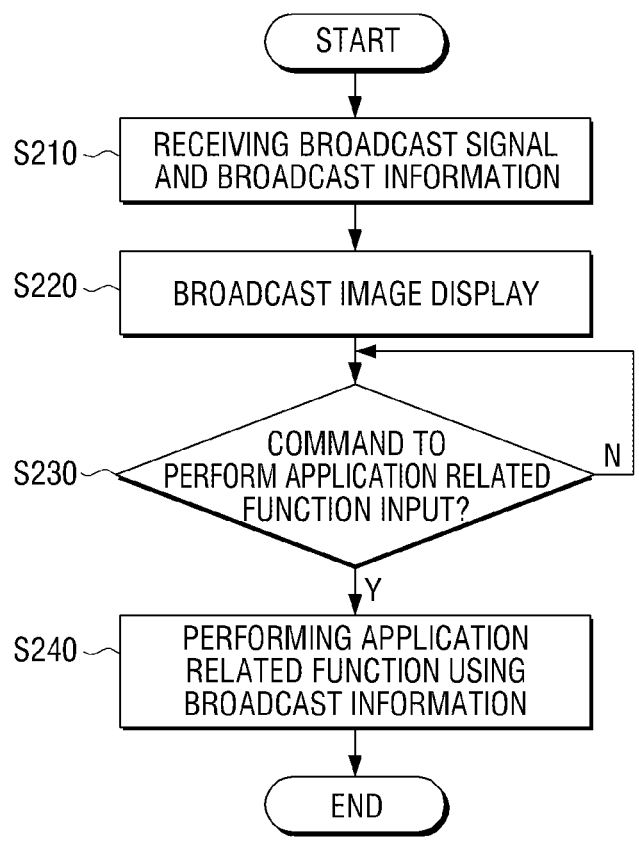
FIG. 2 is a flow chart provided to explain a method for providing application function according to an exemplary embodiment of the present disclosure.

Hereinbelow, with reference to FIG. 2, a method for providing an application function of the TV 100 is presented. FIG. 2 as a flowchart explaining the method for providing an application function according to an exemplary embodiment of the present disclosure.

The TV 100 receives the broadcast signal and the broadcast information (S210). Herein, the broadcast information is meta data on the broadcast program and advertisement. The broadcast receiving unit 110 receives EPG information together with the broadcast signal, and in the received EPG information, the meta data of the broadcast program and the advertisement is included. The meta data includes the title information of the broadcast program and advertisement, broadcast time information, channel information, contents provider information, category information, and genre information.

In addition, the TV 100 displays the broadcast image on the screen using the received broadcast signal (S220). In this situation, the TV 100 detects whether or not a command to perform the application related function is input (S230).

In the case where a command to perform the application related function is input through the remote control by the user (S230-Y), the TV 100 performs the application related function using the broadcast information on the broadcast image which is currently being displayed (S240).

More specifically, when the command to perform the application related function is input, the TV 100 compares the broadcast information on the broadcast image which is currently being displayed with the application related information. In addition, the TV 100 performs the application related function which corresponds to the broadcast information of the broadcast image which is currently being displayed.

For example, the TV 100 may perform the application function which corresponds to the title information of the broadcast program. In addition, the TV 100 may perform the application function related to the contents provider of the broadcast program.

As aforementioned, in the case where a command to perform the application related function is input by the user, the TV 100 may perform the application related function using the broadcast information on the broadcast image which is currently being displayed. Therefore, the user is able to select the application related to the program which is currently being broadcasted more easily.

Specific examples of the application related function include the application list display function and the web browsing application function. These functions will be explained in greater detail below with reference to FIGS. 3-8B.

Hereinbelow, the application list display function will be detailed in greater detail with reference to FIGS. 3-5B. FIG. 3 is a flowchart provided to explain the process of performing an application list display command according to an exemplary embodiment of the present disclosure.

In the first instance, the TV 100 determines whether or not an application list display command has been input by the remote control 190 etc. (S310). In addition, when the application list display command has been input (S310-Y), an application which corresponds to the broadcast information on the broadcast image which is currently being displayed is searched (S320).

For example, in the case where the category information of the broadcast image which is currently being broadcasted is sports, the TV 100 searches the applications related to sports of among the executable applications.

Then, the TV 100 determines whether or not the broadcast image which is currently being displayed is a broadcast program (S330). In the case where the broadcast image which is currently being displayed is a broadcast program (S330-Y), the TV 100 displays on a partial area of the screen an application list where the searched applications are included (S340). As a specific example, with reference to FIG. 4B, the TV 100 displays the broadcast screen on the left half of the screen and the application list on the right half of the screen.

As aforementioned, in the case where the TV 100 is displaying a broadcast program, the TV 100 displays the application list on a partial area of the screen. Therefore, the user becomes able to see the application list while watching the broadcast program.

Meanwhile, in the case where the broadcast image which is currently being displayed is an advertisement (S350-Y), the TV 100 displays on the entire screen the application list where the searched applications are included (S360). More specifically, with reference to FIG. 5B, it can be seen that the TV 100 displays the application list on the entire screen.

Thus, in the case where the TV 100 is displaying the advertisement, the TV 100 displays the application list on the entire area. Therefore, the user can view the application list on the entire screen instead of an advertisement during the time of advertisement.

In addition, according to such a process, the TV 100 generates an appropriate application list which corresponds to the broadcast information of the broadcast image which is currently being broadcasted and displays the appropriate application list.

Specific examples of displaying the application list will be explained in greater detail with reference to FIGS. 4A-5B.

Figure 4B:
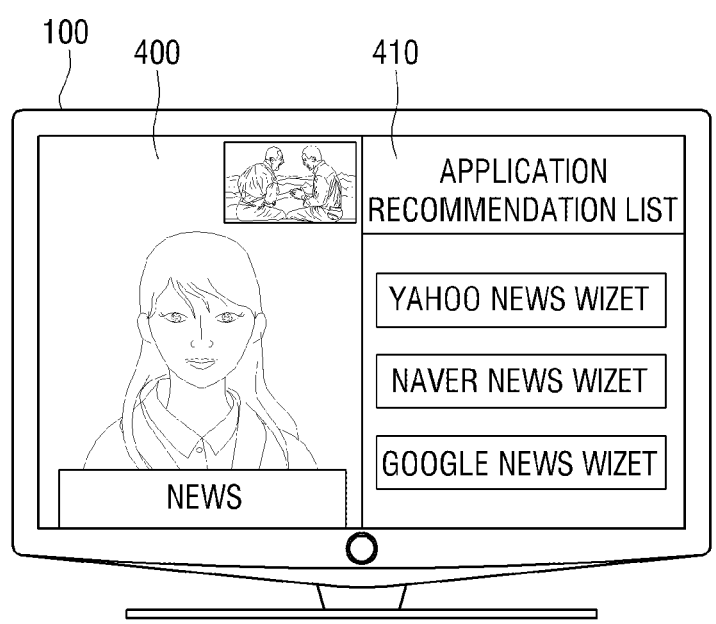

FIGS. 4A-4B illustrate the screen when the application list display command is performed during display of the broadcast program.

FIG. 4A illustrates the case where a news program 400 is displayed on the screen. Herein, the news program 400 is the broadcast program. As illustrated in FIG. 4A, when an application list display command is input through the remote control 190 in the state where the news program 400 is being displayed, the application list 410 is displayed on a partial area of the screen.

Herein, it can be seen that in the application list 410, "YAHOO NEWS WIDGET", "NAVER NEWS WIDGET", AND "GOOGLE NEWS WIDGET" are included. That is, since the broadcast program which is currently being broadcasted is news, the applications included in the application list 410 are those which were searched by news widgets. As aforementioned, the TV 100 displays on the screen the application list which consists of applications related to the genre of the broadcast information of the current broadcast image.

In addition, it can be seen with reference to FIG. 4B that in the TV 100, the news program 400 is displayed on the left half area of the screen and the application list 410 is displayed on the right half area of the screen. In the case of FIG. 4B, since the current broadcast image is the news program 400, the TV 100 displays the news program 400 and the application list 410 together on the screen.

Figure 5A:
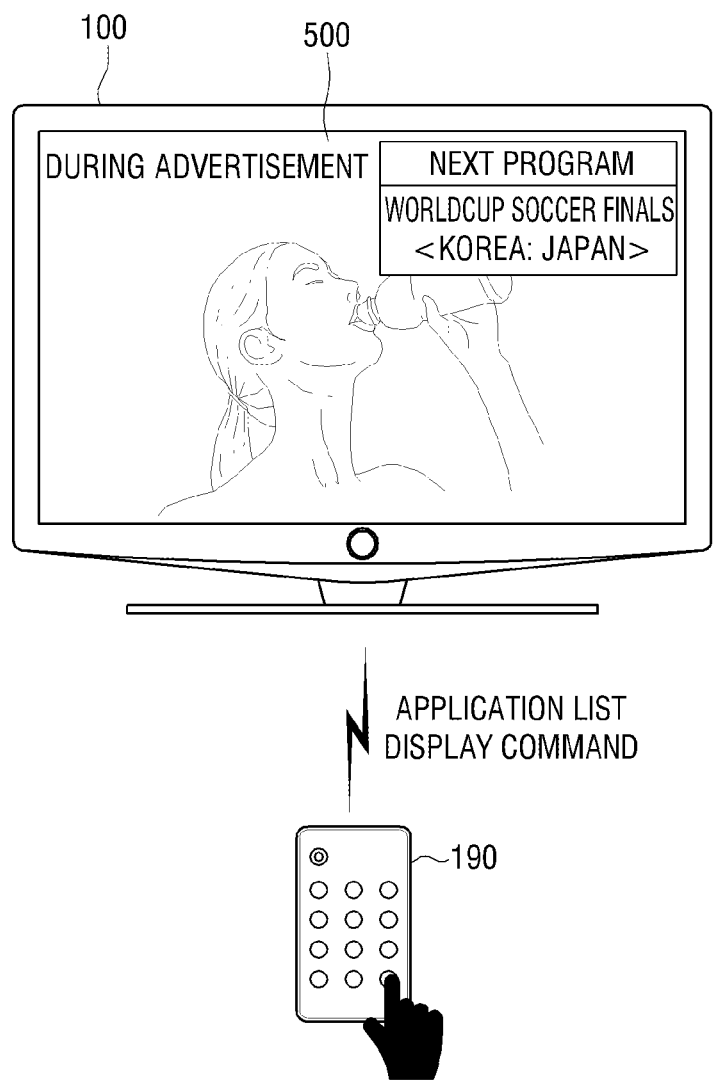
FIGS. 5A and 5B illustrate a screen where the application list display command is performed during when an advertisement is being displayed according to an exemplary embodiment of the present disclosure.
Figure 5B:
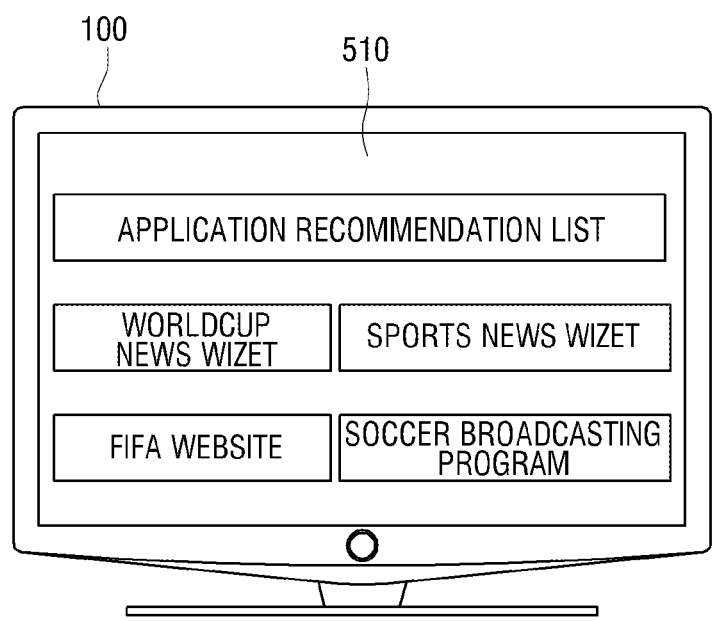

FIGS. 5A-5B illustrate the screen when a command to perform the application list is performed when an advertisement is being displayed.

FIG. 5A illustrates when the advertisement 500 is being displayed on the screen. When the application list display command is input through the remote control 190 when the advertisement 500 is being displayed, the application list 510 is displayed on the entire area of the screen as illustrated in FIG. 5B.

Herein, it can be seen that in the application list 510, "WORLDCUP NEWS WIDGET", "SPORTS NEWS WIDGET", "FIFA WEBSITE", AND "SOCCER BROADCASTING PROGRAM" are included. That is, since the advertisement is currently being broadcasted and the next program relates to worldcup soccer, the applications included in the application list 510 are also those searched by widgets related to soccer. As aforementioned, the TV 100 displays on the screen the application list which consists of the applications related to the next program broadcasting information of the advertisement which is currently being broadcasted. However, it is a matter of course that the TV 100 can also display the application list which consists of the applications related to the broadcast information of the advertisement.

Furthermore, with reference to FIG. 5B, it can be seen that the application list 510 is displayed on the entire screen area of the TV 100, since the current broadcast image is an advertisement 500.

As aforementioned, the TV 100 displays the application list which consists of the applications related to the broadcast information on the broadcast image which is currently being displayed. Therefore, the user can select the application related to the currently broadcasted program more easily.

In addition, the TV 100 displays the application list on the partial area of the screen during the broadcast program time, and displays the application list on the entire area of the screen during the advertisement time. Therefore, the user is able to see the broadcast program and the application list together during the broadcast program time, and concentrate solely on the application list during the advertisement time.

Hereinbelow, a process of executing the internet web browsing application is explained with reference to FIGS. 6-8B. FIG. 6 is a flowchart explaining the process of performing the command to execute the internet web browser according to another exemplary embodiment of the present disclosure. Herein, the internet web browsing application is used to have the same meaning as the internet web browser.

First, the TV 100 determines whether or not a command to execute the internet web browsing application is input through the remote control 190 (S610). In addition, when the command to execute the internet web browsing application is input (S610-Y), the internet site which corresponds to the broadcast information on the currently displayed broadcast image is searched (S620).

For example, in the case where the category information of the broadcast image which is currently being broadcasted is sports, the TV 100 searches the sites related to sports from among the internet sites.

Next, the TV 100 determines whether or not the currently displayed broadcast image is a broadcast program (S630). In the case where the broadcast image which is currently being displayed is a broadcast program (S630-Y), the TV 100 displays on the partial area of the screen the application list where the searched applications are included (S640). As a specific example, with reference to FIG. 7B, the TV 100 displays the broadcast screen on the left half of the screen and the internet web browser on the right half of the screen.

As aforementioned, in the case where the TV 100 is displaying the broadcast program, the TV 100 displays the internet web browser on a partial area of the screen. Therefore, the user is able to see the internet web browser while watching the broadcast program.

Meanwhile, in the case where the broadcast image which is currently being displayed is an advertisement (S650-Y), the TV 100 displays the internet web browser which has the internet site searched on the entire screen as the starting page (S660). As a specific example, with reference to FIG. 8B, the TV 100 displays the internet web browser on the entire screen.

As aforementioned, in the case where the TV 100 is displaying the advertisement, the TV 100 displays the internet web browser on the entire area of the screen. Therefore, the user is able to see only the internet web browser on the entire screen during the advertisement time.

In addition, according to this process, the TV 100 displays the internet web browser having an appropriate internet site which corresponds to the broadcast information of the broadcast image which is currently being broadcasted as the starting page.

The specific examples of displaying the internet web browser will be explained in greater detail with reference to FIGS. 7A-8B.

Figure 7A:
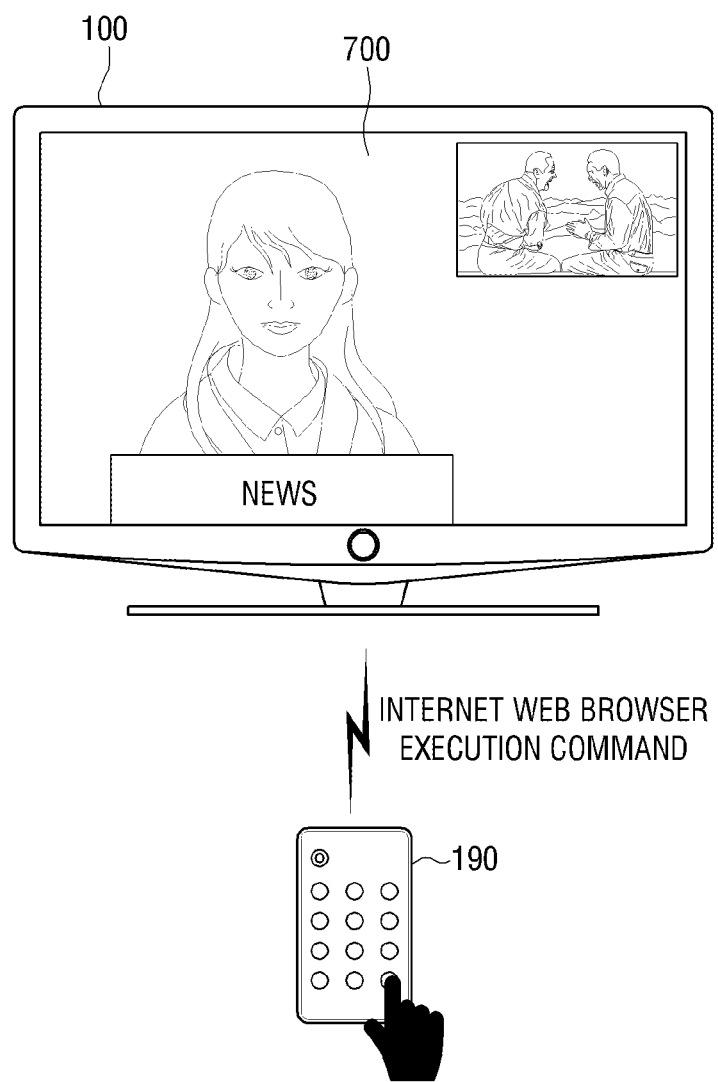
FIGS. 7A and 7B illustrate a screen where the internet web browser execution command is performed during when the broadcast program is being displayed according to an exemplary embodiment of the present disclosure.
Figure 7B:
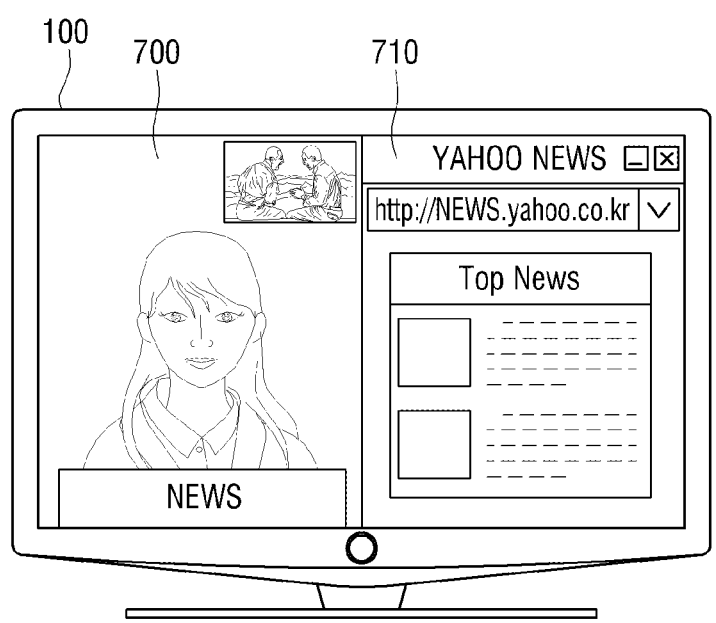

FIGS. 7A and 7B illustrate a screen where a command to execute the internet web browser is performed when the broadcast program is displayed according to an exemplary embodiment of the present disclosure.

FIG. 7A illustrates the case when the news program 700 is being displayed on the screen of the TV 100. Herein, the news program 700 is the broadcast program. As illustrated in FIG. 7A, when a command to execute the internet web browsing application is input through the remote control 190 while the news program 700 is being displayed, as illustrated in FIG. 7B, the internet web browser 710 is displayed on a partial area of the screen simultaneously with the news program 700.

Herein, the internet web browser 710 can see that "YAHOO NEWS HOMEPAGE" is the starting page. That is, since the category information of the current broadcast program is news, the news website is searched as the starting page on the internet web browser 710. As aforementioned, the TV 100 displays the web browser 710 on the screen having the internet site related to the broadcast information of the broadcast image which is currently being broadcasted as the starting page.

In addition, with reference to FIG. 7B, it can be seen that on the TV 100, the news program 700 is displayed on the left area of the screen, while the internet web browser 710 is displayed on the right area of the screen. That is, since the current broadcast image is a news program 700, the TV 100 displays the news program 700 and the internet web browser 710 together on the screen.

Figure 8A:
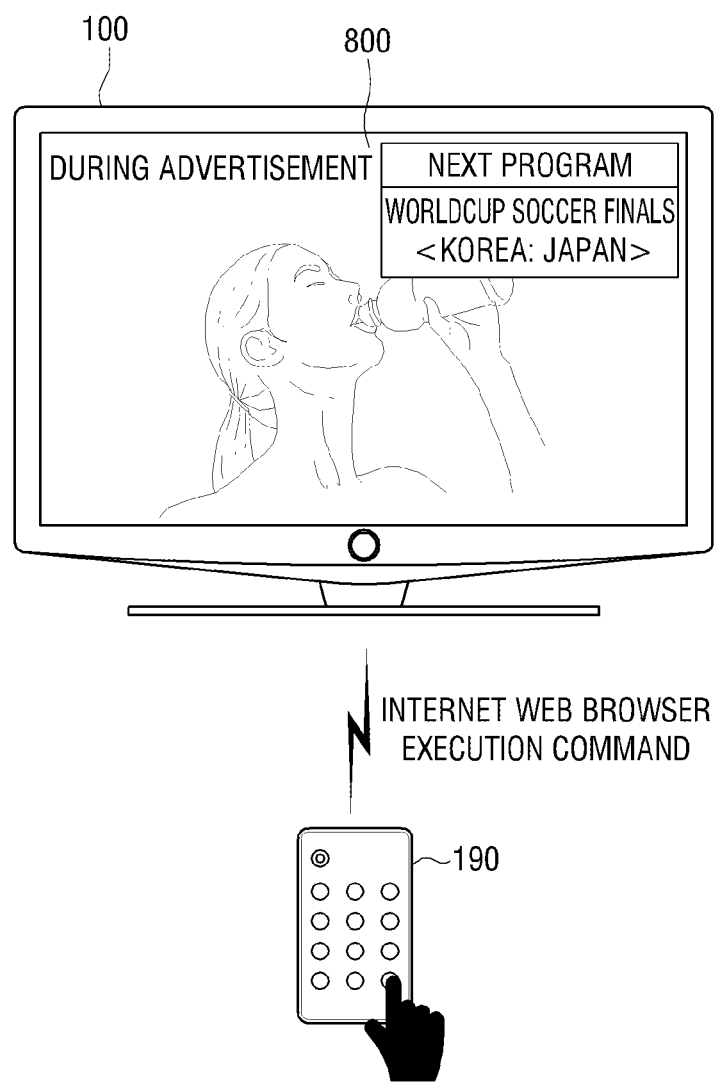
FIGS. 8A and 8B illustrate a screen where the internet web browser execution command is performed during when the advertisement is being displayed.
Figure 8B:
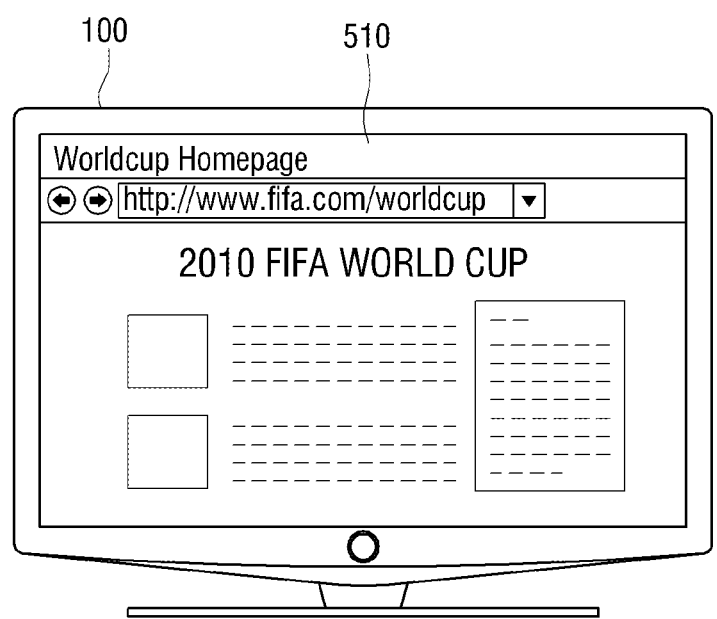

FIGS. 8A and 8B illustrate a screen where a command to execute the internet web browser is performed when the advertisement is displayed according to an exemplary embodiment of the present disclosure.

FIG. 8A illustrates the case when the advertisement 800 is being displayed on the screen of the TV 100. As illustrated in FIG. 8A, when a command to execute the internet web browsing application is input through the remote control 190 while the advertisement is being displayed, the internet web browser 810 is displayed on the entire area of the screen.

Herein, the internet web browser 810 can see whether or not "WORLDCUP WEBSITE" is the starting page. That is, since the advertisement is currently being broadcasted and the title information of the next program is worldcup soccer, a site related to worldcup soccer is searched as the starting page of the internet web browser 810. Thus, the TV 100 displays on the screen the internet site related to the next program broadcast information of the advertisement which is currently being broadcasted as the starting page of the internet web browser 810. However, it is a matter of course that the TV 100 can display the internet site related to the broadcast information of the advertisement as the starting page of the internet web browser 810.

In addition, the TV 100 displays the internet web browser 810 on the entire area of the screen. In the case of FIG. 8B, since the current broadcast image is the advertisement 800, the TV 100 displays the internet web browser 810 on the entire area of the screen.

As aforementioned, the TV 100 displays the internet web browser 810 having the internet site related to the broadcast information on the broadcast image which is currently being displayed as the starting page. Therefore, the user can easily see the internet site related to the program which is currently being broadcasted.

In addition, the TV 100 displays the internet web browser on a partial area of the screen during the broadcast program time, and displays the internet web browser on the entire area of the screen during the advertisement time. Therefore, the user can see the broadcast program and the internet web browser together during the broadcast program time, and can concentrate only on the internet web browser during the advertisement time.

As aforementioned, in the case where a command to perform various kinds of application relate functions is input by the user, the TV 100 performs the application related function based on the broadcast information of the broadcast image which is currently being displayed. Therefore, the user is able to easily use the application related to the currently broadcasted program.

In this exemplary embodiment, the display apparatus was a TV, but any display apparatus which is capable of performing the application function related to the broadcast information can be applied besides a TV. For example, the technological concept of the present disclosure can also be applied to cellular phones, PMPs, and MP3s, and any applicable device which connects to a screen display.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display apparatus comprising:
a broadcast receiving unit which receives a broadcast signal and broadcast information;
a display unit including a screen which displays a broadcast image which corresponds to the broadcast signal; and
a controlling unit which performs a function which displays an application list which consists of applications related to the broadcast information of the broadcast image which is currently being displayed on the display unit, when a command to perform an application related function is input by a user, and
the controlling unit is configured to determine whether the broadcast image which is currently being displayed on the display unit is a broadcast program or an advertisement, and controls the display unit to display the application list on a partial area of the screen during a time when the broadcast image is a broadcast program and controls the display unit to display the application list on an entire area of the screen during a time when the broadcast image is an advertisement.

2. The display apparatus according to claim 1, wherein the broadcast information is meta data on the broadcast program.

3. The display apparatus according to claim 1, wherein the broadcast information comprises at least one of title information of the broadcast program, contents provider information, and category information.

4. The display apparatus according to claim 1, wherein the application related function is an application list display function, and the controlling unit searches an application which corresponds to the broadcast information of the currently displayed broadcast image, and controls the application related function so that a list on the searched application is displayed on the screen, when a command to perform the application list display function is input by the user.

5. The display apparatus according to claim 4, wherein the controlling unit controls the application related function so that a list of the applications which correspond to at least one of the title information of the broadcast image, the contents provider information, and the category information from among the applications executable in the display apparatus is displayed on the screen.

6. The display apparatus according to claim 1, wherein the application related function is an internet web browsing application function, and the controlling unit controls the application related function so that a web page, which corresponds to the broadcast information of a currently displayed broadcast image, is displayed as a starting page, when a command to perform the internet web browsing application function is input by the user.

7. A method for providing an application function comprising:
receiving a broadcast signal and a broadcast information;
displaying, on a screen, a broadcast image which corresponds to the broadcast signal;
performing a function which displays an application list which consists of applications related to the broadcast information of the broadcast image which is currently being displayed if a command to perform the application related function is input by a user,
and
determining whether the broadcast image which is currently being displayed is a broadcast program or an advertisement,
displaying the application list on a partial area of the screen during a time when the broadcast image is a broadcast program, and displaying the application list on an entire area of the screen during a time when the broadcast image is an advertisement.

8. The method for providing the application function according to claim 7, wherein the broadcast information is meta data on the broadcast program.

9. The method for providing the application function according to claim 7, wherein the broadcast information comprises at least one of title information of the broadcast program, contents provider information, and category information.

10. The method for providing the application function according to claim 7, wherein the application related function is an application list display function, and the performing the application related function comprises:
searching an application which corresponds to the broadcast information of the currently displayed broadcast image, when a command to perform the application list display function is input by the user; and
displaying a list on the searched application on the screen.

11. The method for providing an application function according to claim 10, wherein the searching searches an application which corresponds to at least one of title information of the broadcast image, contents provider information, and category information from among the applications executable in the display apparatus.

12. The method for providing the application function according to claim 7, wherein the application related function is an internet web browsing application function, and
   the performing the application related function includes displaying a web page which corresponds to the broadcast information of the broadcast image which is currently being displayed as a starting page, if a command to perform the internet web browsing application function is input by the user.

* * * * *